(12) United States Patent
Knoche et al.

(10) Patent No.: US 10,026,328 B2
(45) Date of Patent: Jul. 17, 2018

(54) DYNAMIC DIFFERENTIAL DIAGNOSIS TRAINING AND EVALUATION SYSTEM AND METHOD FOR PATIENT CONDITION DETERMINATION

(71) Applicant: i-Human Patients, Inc., Mammoth Lakes, CA (US)

(72) Inventors: Craig Knoche, Mammoth Lakes, CA (US); Anne Knoche, Mammoth Lakes, CA (US)

(73) Assignee: i-Human Patients, Inc., Sunnyvale, CA (US)

(*) Notice: Subject to any disclaimer, the term of this patent is extended or adjusted under 35 U.S.C. 154(b) by 858 days.

(21) Appl. No.: 14/520,172

(22) Filed: Oct. 21, 2014

(65) Prior Publication Data
US 2016/0111021 A1    Apr. 21, 2016

(51) Int. Cl.
G09B 5/00 (2006.01)
G09B 5/02 (2006.01)
G09B 7/00 (2006.01)

(52) U.S. Cl.
CPC ............... G09B 5/02 (2013.01); G09B 7/00 (2013.01)

(58) Field of Classification Search
CPC ........ G06Q 50/22; G06Q 50/24; G09B 23/28; G09B 5/02
See application file for complete search history.

(56) References Cited

U.S. PATENT DOCUMENTS

| | | | | |
|---|---|---|---|---|
| 2013/0041243 A1* | 2/2013 | Byrd | ............... | G06T 19/003 600/374 |
| 2014/0127662 A1* | 5/2014 | Kron | ............... | G09B 23/28 434/262 |
| 2016/0012349 A1* | 1/2016 | Lai | ............... | G06F 19/3437 706/12 |

* cited by examiner

Primary Examiner — Joseph D Burgess
(74) Attorney, Agent, or Firm — Invent Capture, LLC.; Samuel S. Cho

(57) ABSTRACT

A dynamic differential diagnosis training and evaluation system incorporates a beginner student learning mode, a beginner student test mode, an advanced student learning mode, and an advanced student test mode for training, nurturing, and evaluating dynamic differential diagnosis (dynamic DDx) reasoning skills for patient condition determination. In a preferred embodiment of the invention, the dynamic differential diagnosis training and evaluation system incorporates one or more computerized user interfaces for displaying, choosing, and interacting with a simulated virtual patient, hypotheses selections for the patient condition determination, simulated physical exam selections, simulated medical test selections, simulated medical test results, a computerized expert's feedback and answers, and an iterative differential diagnosis (DDx) list modification and refinement process that simulates real-life dynamic differential diagnosis (dynamic DDx). Furthermore, the dynamic differential diagnosis training and evaluation system can also incorporate healthcare education contents generated from a healthcare content authoring platform.

12 Claims, 17 Drawing Sheets

A Beginner Student Learning Mode for Dynamic Differential Diagnosis (Dynamic DDx) in a Healthcare Diagnosis Training and Evaluation System
100

A Beginner Student Learning Mode for Dynamic Differential Diagnosis (Dynamic DDx) in a Healthcare Diagnosis Training and Evaluation System

100

A Beginner Student Test Mode for Dynamic Differential Diagnosis (Dynamic DDx) in a Healthcare Diagnosis Training and Evaluation System

200

An Advanced Student Learning Mode for Dynamic Differential Diagnosis (Dynamic DDx) in a Healthcare Diagnosis Training and Evaluation System

300

An Advanced Student Test Mode for Dynamic Differential Diagnosis (Dynamic DDx) in a
Healthcare Diagnosis Training and Evaluation System
400

A Virtual Patient Health Questioning Interface Screenshot in a Healthcare Diagnosis Training and Evaluation System

500

A Hypothesis Selection and Ranking Interface Screenshot During Health Questioning in a Healthcare Diagnosis Training and Evaluation System

600

A Physical Exam Interface Screenshot in a Healthcare Diagnosis Training and Evaluation System

700

A Hypothesis Selection and Ranking Interface Screenshot during a Physical Exam in a Healthcare Diagnosis Training and Evaluation System

800

An Expert Feedback Interface Screenshot After Health Questioning and Physical Exams in a Healthcare Diagnosis Training and Evaluation System

900

Figure 10:
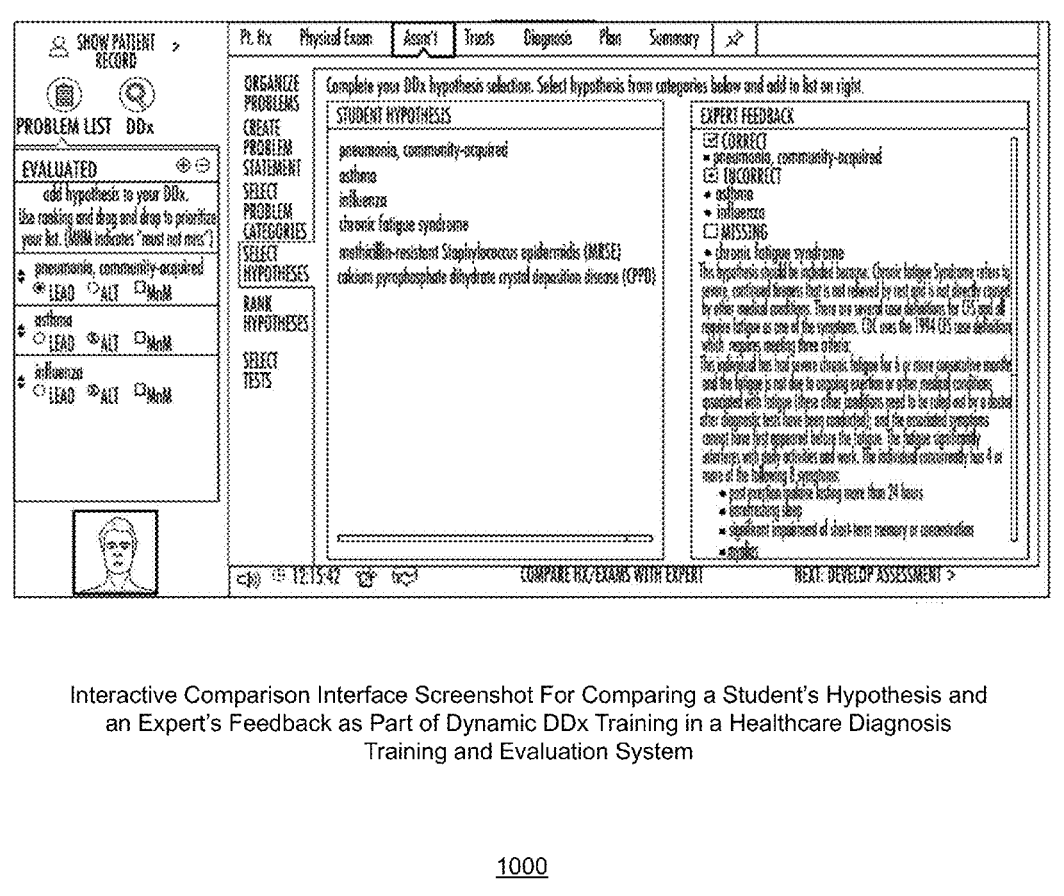

Interactive Comparison Interface Screenshot For Comparing a Student's Hypothesis and an Expert's Feedback as Part of Dynamic DDx Training in a Healthcare Diagnosis Training and Evaluation System

A Hypothesis Ranking Interface Screenshot as Part of Dynamic DDx Training in a Healthcare
Diagnosis Training and Evaluation System

A Hypothesis and Medical Test Association Interface and Expert Feedback Screenshot as Part of Dynamic DDx Training in a Healthcare Diagnosis Training and Evaluation System

1200

A Medical Test Selection and DDx Commitment Interface Screenshot as Part of Dynamic DDx Training in a Healthcare Diagnosis Training and Evaluation System

1300

A Medical Test Result Interface Screenshot as Part of Dynamic DDx Training in a Healthcare Diagnosis Training and Evaluation System

1400

A Student Diagnosis Evaluation Interface Screenshot as Part of Dynamic DDx Training in a Healthcare Diagnosis Training and Evaluation System

1500

A Student Hypotheses Evaluation and Expert Feedback Interface Screenshot as Part of Dynamic DDx Training in a Healthcare Diagnosis Training and Evaluation System

1600

Figure 17:
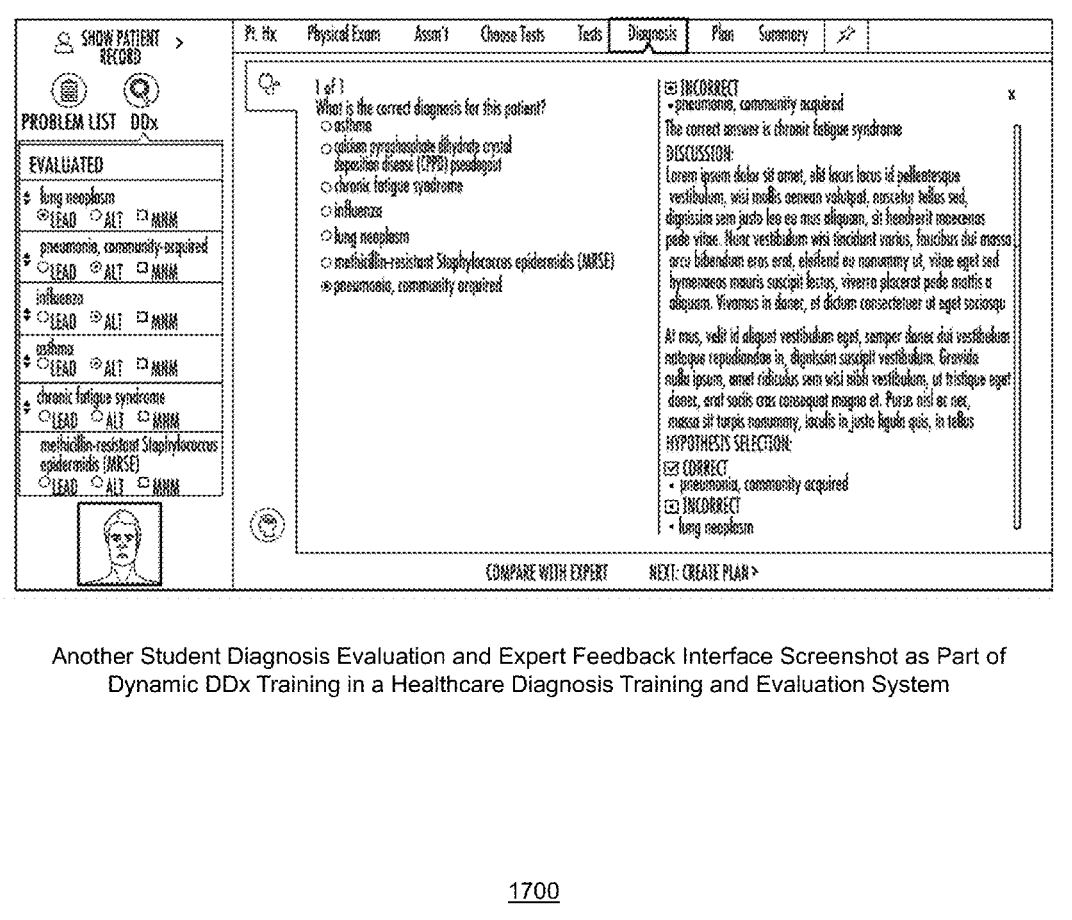

Another Student Diagnosis Evaluation and Expert Feedback Interface Screenshot as Part of
Dynamic DDx Training in a Healthcare Diagnosis Training and Evaluation System

DYNAMIC DIFFERENTIAL DIAGNOSIS TRAINING AND EVALUATION SYSTEM AND METHOD FOR PATIENT CONDITION DETERMINATION

FIELD OF THE INVENTION

The present invention generally relates to interactive educational software, computerized user interfaces, and electronic systems. The present invention also relates to one or more healthcare education software programs, systems, and methods. More specifically, the present invention relates to a dynamic differential diagnosis training and evaluation system for patient condition determination. Furthermore, the present invention also relates to a novel method of learning dynamic differential diagnosis for patient condition determination through an e-learning solution.

INCORPORATION BY REFERENCE

A US non-provisional patent application, U.S. Ser. No. 14/450,186, titled "Electronic Healthcare Education System and Method," and filed on Aug. 1, 2014, is incorporated herein by reference.

BACKGROUND OF THE INVENTION

Electronic learning (e-learning) and educational training in today's healthcare industry tend to focus on passive learning based on a linear presentation of medical information and a subsequently serialized testing of the presented medical information. For example, in a conventional method of presenting clinical training information over a computerized interface, a medical student, a paramedic trainee, a nursing trainee, or another healthcare industry professional is typically presented with linearly-broadcasted medical information that lacks interactive, hands-on, and empirical clinical training experience.

Unfortunately, the linearly-broadcasted medical information presented to a healthcare trainee is often detached from the reality of clinical practice, especially in case of diagnostic reasoning and differential diagnosis training for patient conditions and symptoms. In real-life clinical practice, a seasoned physician relies on his or her clinical knowledge and experience to conduct a time-efficient and educated guess for identifying a particular disease. In most circumstances, the seasoned physician does not linearly and exhaustively search through all possible differential diagnosis to identify the particular disease. The ability to identify a patient's disease correctly, based on one's own clinical knowledge and experience, is called "dynamic DDx," or dynamic differential diagnosis. Conventional e-learning products in the healthcare industry are unable to instill trainees with dynamic differential diagnosis reasoning skills, which is an invaluable skill set in real-life clinical practice for an effective and rapid patient diagnosis.

Furthermore, conventional e-learning systems do not provide healthcare trainees with an integrated and simulated patient diagnosis training and evaluation interface that allows the healthcare trainees to nurture or test any skill set associated with dynamic differential diagnosis reasoning In addition, conventional e-learning systems do not provide the healthcare trainees with a robust training guidance and feedback provided by a healthcare education expert.

Therefore, it may be desirable to provide a dynamic differential diagnosis training and evaluation system and a related method for patient condition determination. Furthermore, it may also be desirable to provide a dynamic differential diagnosis training and evaluation system and a related method that enable testing and evaluation of a healthcare trainee's dynamic differential diagnosis reasoning skills for patient condition determination.

Moreover, it may also be desirable to provide an e-learning system that provides a robust training guidance and evaluation feedback conceived by a healthcare education expert who utilizes a robust set of clinical research data linked to a healthcare content authoring platform.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a healthcare diagnosis training and evaluation system is disclosed. This system comprises: a learning mode selection interface module that generates a user selection menu for a basic linear learning mode, a beginner student learning mode for dynamic differential diagnosis, and an advanced student learning mode for dynamic differential diagnosis; a hypothesis selection and ranking interface module that allows a student to add, delete, rank, or modify a hypothesis in the differential diagnosis list during a health questioning, a simulated physical exam, a simulated medical test, and a simulated medical tests review, wherein the hypothesis selection and ranking interface module generates a differential diagnosis management menu to create or modify a differential diagnosis list for patient condition determination; a virtual patient health questioning interface module that generates a list of health questions selected by a student, an image of a simulated virtual patient, and simulated responses from the simulated virtual patient from the list of health questions, wherein the virtual patient health questioning interface module also incorporates the differential diagnosis management menu to allow the student to create or modify the differential diagnosis list for patient condition determination; a physical exam interface module that enables the student to perform the simulated physical exam on the simulated virtual patient, wherein the physical exam interface module also incorporates the differential diagnosis management menu to allow the student to revise the differential diagnosis list for patient condition determination during or after the simulated physical exam; a hypothesis and medical test association interface module that allows the student to associate the simulated medical test to a particular hypothesis in the differential diagnosis list, wherein the hypothesis and medical test association interface module also incorporates the differential diagnosis management menu to allow the student to revise the differential diagnosis list for patient condition determination; a medical test selection and differential diagnosis commitment interface module that requires the student to commit a current set of the differential diagnosis list for computerized evaluation, while also requiring the student to finalize simulated medical test selections for patient condition determination; a medical test results interface module that generates results of the simulated medical test, wherein the results are reviewed by the student for deducing a definitive diagnosis for evaluation; an expert feedback interface module that generates at least one of advice, feedback, and answers to guide the student through the dynamic differential diagnosis reasoning during display of information from the hypothesis selection and ranking interface module, the virtual patient health questioning interface module, the physical exam interface module, the hypothesis and medical test association interface module, the medical test selection and differential diagnosis commitment interface module, and the medical test results interface module; a student diagnosis evaluation interface module that compares the definitive diagnosis and associated diagnostic reasoning from the student against at least one of advice, feedback, and answers from the expert feedback interface module, wherein the student diagnosis evaluation interface module also generates a grading result based on correctness of the definitive diagnosis and the associated diagnostic reasoning from the student; and a central processing unit (CPU) and a memory unit of a computer system or another electronic device, wherein the CPU and the memory unit execute at least one of the learning mode selection interface module, the hypothesis selection and ranking interface module, the virtual patient health questioning interface module, the physical exam interface module, the hypothesis and medical test association interface module, the medical test selection and differential diagnosis commitment interface module, the medical test results interface module, the expert feedback interface module, and the student diagnosis evaluation interface module.

In another embodiment of the invention, a healthcare diagnosis training and evaluation system is also disclosed. This system comprises: a test mode selection interface module that generates a user selection menu for a basic linear test mode, a beginner student test mode for dynamic differential diagnosis, and an advanced student test mode for dynamic differential diagnosis; a hypothesis selection and ranking interface module that allows a student to add, delete, rank, or modify a hypothesis in the differential diagnosis list during a health questioning, a simulated physical exam, a simulated medical test, and a simulated medical tests review, wherein the hypothesis selection and ranking interface module generates a differential diagnosis management menu to create or modify a differential diagnosis list for patient condition determination; a virtual patient health questioning interface module that generates a list of health questions selected by a student, an image of a simulated virtual patient, and simulated responses from the simulated virtual patient from the list of health questions, wherein the virtual patient health questioning interface module also incorporates the differential diagnosis management menu to allow the student to create or modify the differential diagnosis list for patient condition determination; a physical exam interface module that enables the student to perform the simulated physical exam on the simulated virtual patient, wherein the physical exam interface module also incorporates the differential diagnosis management menu to allow the student to revise the differential diagnosis list for patient condition determination during or after the simulated physical exam; a hypothesis and medical test association interface module that allows the student to associate the simulated medical test to a particular hypothesis in the differential diagnosis list, wherein the hypothesis and medical test association interface module also incorporates the differential diagnosis management menu to allow the student to revise the differential diagnosis list for patient condition determination; a medical test selection and differential diagnosis commitment interface module that requires the student to commit a current set of the differential diagnosis list for computerized evaluation, while also requiring the student to finalize simulated medical test selections for patient condition determination; a medical test results interface module that generates results of the simulated medical test, wherein the results are reviewed by the student for deducing a definitive diagnosis for evaluation; a treatment and management plan composition interface module that takes the student's input for a treatment and management plan; a student diagnosis evaluation interface module that evaluates the definitive diagnosis, the treatment and management plan, and associated diagnostic reasoning to generate a grading result based on correctness of the definitive diagnosis, the treatment and management plan, and the associated diagnostic reasoning from the student; and a central processing unit (CPU) and a memory unit of a computer system or another electronic device, wherein the CPU and the memory unit execute at least one of the testing mode selection interface module, the hypothesis selection and ranking interface module, the virtual patient health questioning interface module, the physical exam interface module, the hypothesis and medical test association interface module, the medical test selection and differential diagnosis commitment interface module, the medical test results interface module, the treatment and management plan composition interface module, and the student diagnosis evaluation interface module.

BRIEF DESCRIPTION OF DRAWINGS

FIG. 10 shows an interactive comparison interface screenshot for comparing a student's hypothesis and an expert's feedback as part of dynamic DDx training in a healthcare diagnosis training and evaluation system, in accordance with an embodiment of the invention.

FIG. 11 shows a hypothesis ranking interface screenshot as part of dynamic DDx training in a healthcare diagnosis training and evaluation system, in accordance with an embodiment of the invention.

FIG. 17 shows another student diagnosis evaluation and expert feedback interface screenshot as part of dynamic DDx training in a healthcare diagnosis training and evaluation system, in accordance with an embodiment of the invention.

DETAILED DESCRIPTION

Figure 1:
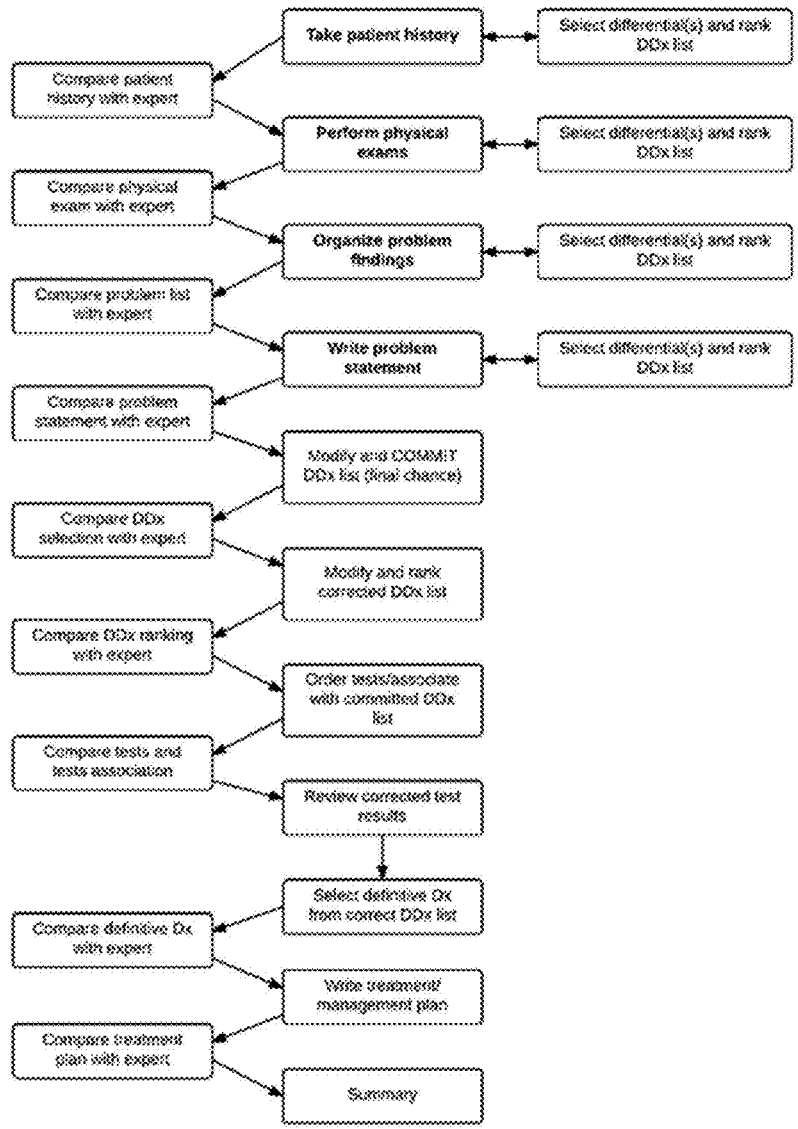
FIG. 1 shows a beginner student learning mode flowchart for dynamic differential diagnosis (dynamic DDx) in a healthcare diagnosis training and evaluation system, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble systems and methods for dynamic differential diagnosis training and evaluation of students (e.g. medical students, healthcare trainees, and other healthcare professionals) for patient condition determination. Furthermore, the detailed description is also presented largely in terms of descriptions and/or other symbolic representations that directly or indirectly resemble computerized user interfaces for dynamic differential diagnosis training and evaluation of students. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "healthcare diagnosis training and evaluation system" is defined as a healthcare education software with one or more computerized user interfaces that are executed on a computer or another electronic device for student use. In a preferred embodiment of the invention, the healthcare diagnosis training and evaluation system trains and tests a student to develop and refine dynamic differential diagnosis reasoning skills for correctly determining a patient's condition as quickly as possible. Preferably, evaluation of a student's reasoning skills for differential diagnosis is provided by the healthcare diagnosis training and evaluation system that loads healthcare education contents created by a healthcare education content author who utilizes a healthcare content authoring software platform.

In addition, for the purpose of describing the invention, a term "pivotal concept" is defined as an important keystone that optimizes a diagnostic reasoning process to a focused differential diagnosis involving a smaller subset of possibilities, instead of distracting a student to a raw list of possible diseases associated with symptoms. The pivotal concept can be utilized to train the student to achieve a time-efficient and accurate diagnosis of a patient's disease or condition.

In a preferred embodiment of the invention, a student following a correct diagnostic reasoning pathway through the differential diagnosis training is able to reach and utilize one or more pivotal concepts provided by the healthcare diagnosis training and evaluation system.

Furthermore, for the purpose of describing the invention, a term "differential diagnosis," or "DDx" is defined as a list of potentially-correct diagnosis for a medical or healthcare condition of a patient. Through a process of elimination, logical deduction, linear reasoning, and/or dynamic differential diagnosis, a healthcare professional can find a correct diagnosis for the patient's medical or healthcare condition.

In addition, for the purpose of describing the invention, a term "dynamic differential diagnosis," or "dynamic DDx," is defined as an ability and an empirical process to make and to refine an educated guess expeditiously for a likely diagnosis based on one's own clinical knowledge and experience, without necessitating an exhaustive iterative matching between patient symptoms and a list of potential diseases.

Moreover, for the purpose of describing the invention, a term "student" is defined as a medical student, a nursing trainee, a paramedic trainee, or another healthcare professional-in-training who is learning healthcare-related concepts and information through a computerized user interface from a healthcare diagnosis training and evaluation system.

In addition, for the purpose of describing the invention, a term "electronic healthcare education system" is defined as a healthcare education software executed on a CPU and a memory unit of a computer system or another electronic device, which is utilized to educate and train healthcare trainees, professionals, students, and other users such as physicians, medical students, physician assistants, nurses, emergency response personnel, and other healthcare workers. In a preferred embodiment of the invention, a healthcare diagnosis training and evaluation system is part of an electronic healthcare education system, which may also encompass a healthcare content authoring system, an electronic database of dynamically-updated clinical and patient research information, and other e-learning modules.

One aspect of an embodiment of the present invention is providing a dynamic differential diagnosis training and evaluation system and a related method for patient condition determination.

Another aspect of an embodiment of the present invention is providing a dynamic differential diagnosis training and evaluation system and a related method that enable testing and evaluation of a healthcare trainee's dynamic differential diagnosis reasoning skills for patient condition determination.

Yet another aspect of an embodiment of the present invention is providing an e-learning system that incorporates robust training guidance and evaluation feedback conceived by a healthcare education expert who utilizes a robust set of clinical research data linked to a healthcare content authoring platform.

In a preferred embodiment of the invention, a healthcare diagnosis training and evaluation system may provide several student learning modes and test modes. In one mode of operation, a basic "linear" learning mode provides a student with a linear way of applying differential diagnosis for patient condition determination. In another mode of operation, a beginner student learning mode for dynamic differential diagnosis (dynamic DDx) provides a step-by-step expert guidance, student answer corrections, and advice as the student goes through each stage of the dynamic DDx diagnostic reasoning processes. Yet in another mode of operation, an advanced student learning mode for dynamic differential diagnosis (dynamic DDx) provides the student with more independence to discover and self-correct his or her diagnostic reasoning mistakes, with an iterative process of modifying and revising the student's committed hypothesis, ordering new medical tests, and reviewing the medical test results without the expert answer keys and guidance until a definitive diagnosis (Dx) is deduced from the iterative process.

Furthermore, corresponding student test modes for the basic linear learning mode, the beginner student learning mode for dynamic DDx, and the advanced student learning mode for dynamic DDx can be generated by the healthcare diagnosis training and evaluation system, which also evaluates and quantifies each student's diagnostic reasoning skills through these various student test modes.

FIG. 1 shows a beginner student learning mode flowchart (100) for dynamic differential diagnosis (dynamic DDx) in a healthcare diagnosis training and evaluation system, in accordance with an embodiment of the invention. In a preferred embodiment of the invention, a student is first instructed by a computerized user interface connected to the healthcare diagnosis training and evaluation system to question and probe a simulated virtual patient to build a patient history file. The student may interact with the simulated virtual patient through the computerized user interface to ask health questions and receive answers from the simulated virtual patient. Furthermore, in some instances, the computerized user interface may enable visual inspection of the simulated virtual patient's body parts by the student. Then, the student can write notes into the computerized user interface to build the patient history file for the simulated virtual patient.

In the preferred embodiment of the invention, the student is able to contemplate one or more hypotheses for a potentially-correct diagnosis at this early stage of patient interaction, and select and rank those hypothesis in a differential diagnosis (DDx) selection and ranking interface in the computerized user interface. Then, the patient history file constructed by the student can be compared with an expert's answers and advice through the computerized user interface. The expert feedback and answer comparison process can guide and nurture the student's diagnostic reasoning process to be more precise and time efficient.

Then, as shown in the beginner student learning mode flowchart (100) in FIG. 1, the student can perform virtual physical exams on the simulated virtual patient through health exam menu choices available in the computerized user interface connected to the healthcare diagnosis training and evaluation system. After the results of each virtual physical exam performed by the student are deciphered and interpreted by the student, the student can change or revise the patient diagnostic hypotheses selections and rankings that were previously entered into the differential diagnosis (DDx) selection and ranking interface. The updated patient diagnostic hypotheses selections and rankings, which now incorporate the student's diagnostic reasoning from the results of the virtual physical exams, are then compared with the expert's answers and advice through the computerized user interface.

Subsequently, as shown in the beginner student learning mode flowchart (100) in FIG. 1, the student has an opportunity to organize problem findings and create a "problem list" associated with the simulated virtual patient's medical condition in the computerized user interface. The student also has another opportunity to change or revise the patient diagnostic hypotheses selections and rankings that were previously entered into the differential diagnosis (DDx) selection and ranking interface. Then, the student's problem list is compared with the expert's answers and advice through the computerized user interface. With additional feedback from the expert's answers and advice on the student's problem list, the student then composes and enters a "problem statement" for the simulated virtual patient through the computerized user interface. Furthermore, the student gets another opportunity to change or revise the patient diagnostic hypotheses selections and rankings that were previously entered into the differential diagnosis (DDx) selection and ranking interface. In addition, the problem statement entered by the student in the healthcare diagnosis training and evaluation system is also compared against the expert's answers and advice on the problem statement.

Then, as shown in the beginner student learning mode flowchart (100) in FIG. 1, the student is required to commit to DDx selections in the computerized user interface to modify the patient diagnostic hypotheses selections and rankings. At this stage of the beginner student learning mode, the patient diagnostic hypotheses selections and rankings are "committed" as the final differential diagnosis (DDx) selections. The healthcare diagnosis training and evaluation system can then compare and evaluate the final DDx selections from the student with the expert's answers and advice, and also suggest a corrected DDx list, if the student's final DDx selections require corrections. The student can subsequently modify and rank the corrected DDx list, and then compare the DDx ranking with the expert's answers and advice again.

In the preferred embodiment of the invention for the beginner student learning mode flowchart (100), any desired medical tests based on the corrected DDx list can be ordered and newly associated with the corrected DDx list by the student for the simulated virtual patient. The association between the corrected DDx list and medical tests are then reviewed by the healthcare diagnosis training and evaluation system, and any results from the ordered medical tests are presented to the student through the computerized user interface. The student then selects what he or she considers to be the definitive diagnosis (Dx) from the corrected DDx list, and gets further feedback from the expert's answers. Based on the comparison between the student's definitive Dx and the expert's answers, the student can create and enter a treatment and management plan to the healthcare diagnosis training and evaluation system. Finally, in the beginner student learning mode flowchart (100) of FIG. 1, the student's treatment and management plan is compared against the expert's model treatment plan and feedback, and a summary of the dynamic DDx learning for the beginner student learning mode is provided by the healthcare diagnosis training and evaluation system.

Figure 3:
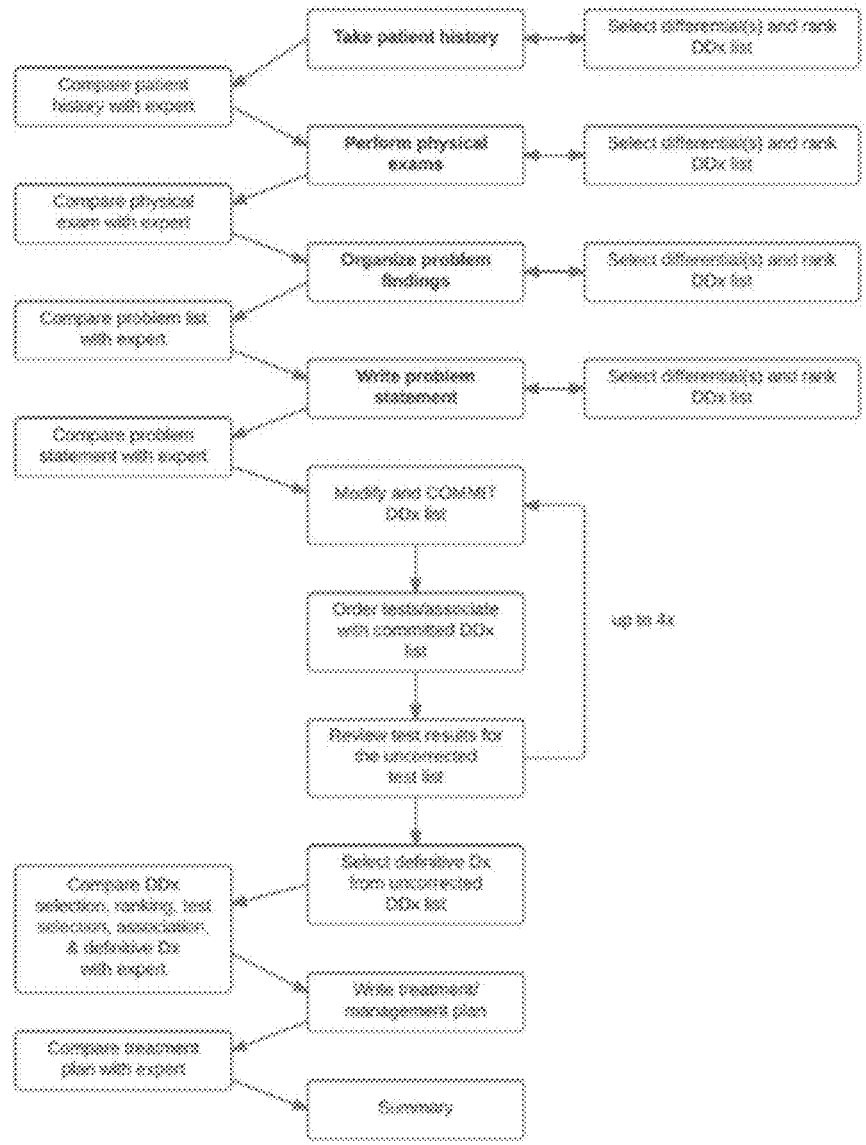
FIG. 3 shows an advanced student learning mode flowchart for dynamic differential diagnosis (dynamic DDx) in a healthcare diagnosis training and evaluation system, in accordance with an embodiment of the invention.

For the beginner student learning mode in the healthcare diagnosis training and evaluation system, the computerized user interface directs the student to compare his or her notion of diagnostic hypotheses with the expert's answers and feedback at each learning stage in order to introduce and nurture the dynamic DDx reasoning skills for the beginner student. For an advanced student, an advanced student learning mode in the healthcare diagnosis training and evaluation system, as shown in FIG. 3, can enable the advanced student to spend more independent time to modify and refine his or her differential diagnosis hypotheses in an iterative manner after a problem statement is composed and compared with the expert's answers and feedback.

Figure 2:
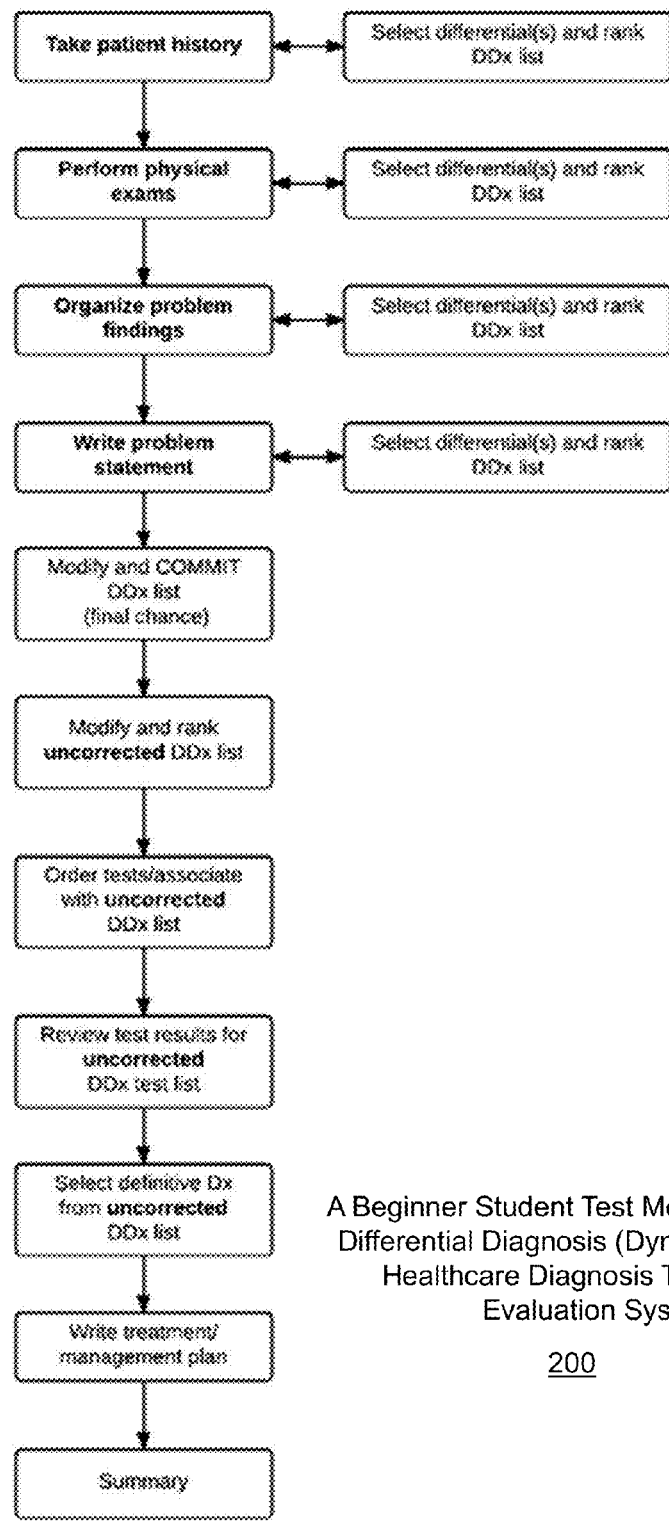
FIG. 2 shows a beginner student test mode flowchart for dynamic differential diagnosis (dynamic DDx) in a healthcare diagnosis training and evaluation system, in accordance with an embodiment of the invention.

FIG. 2 shows a beginner student test mode flowchart (200) for dynamic differential diagnosis (dynamic DDx) in a healthcare diagnosis training and evaluation system, in accordance with an embodiment of the invention. In this embodiment of the invention, a student is tested for his or her dynamic DDx reasoning skills, which may have been nurtured by interacting with the beginner student learning mode, as previously shown in FIG. 1. In the beginner student test mode, the student is evaluated by the healthcare diagnosis training and evaluation system for following correct diagnostic reasoning steps involving dynamic DDx reasoning and for arriving a correct definitive diagnosis for a simulated virtual patient. Because the student is being tested by the healthcare diagnosis training and evaluation system in the beginner student test mode, expert answers and feedbacks are not provided to the student between diagnostic reasoning steps.

As shown in the beginner student test mode flowchart (200) in FIG. 2, the student is first instructed by a computerized user interface connected to the healthcare diagnosis training and evaluation system to question and probe a simulated virtual patient to build a patient history file. The student may interact with the simulated virtual patient through the computerized user interface to ask health questions and receive answers from the simulated virtual patient. Furthermore, in some instances, the computerized user interface may enable visual inspection of the simulated virtual patient's body parts by the student. Then, the student writes notes into the computerized user interface to build the patient history file for the simulated virtual patient, and selects and ranks one or more hypotheses for a potentially-correct diagnosis through a differential diagnosis (DDx) selection and ranking interface in the computerized user interface.

Then, as shown in the beginner student test mode flowchart (200) in FIG. 2, the student performs virtual physical exams on the simulated virtual patient through health exam menu choices available in the computerized user interface connected to the healthcare diagnosis training and evaluation system. After the results of each virtual physical exam ordered by the student are deciphered and interpreted by the student, the student can change or revise the patient diagnostic hypotheses selections and rankings that were previously entered into the differential diagnosis (DDx) selection and ranking interface. Subsequently, the student has an opportunity to organize problem findings and create a "problem list" associated with the simulated virtual patient's medical condition in the computerized user interface. The student also has another opportunity to change or revise the patient diagnostic hypotheses selections and rankings that were previously entered into the differential diagnosis (DDx) selection and ranking interface.

As shown in FIG. 2, the student then composes and enters a "problem statement" for the simulated virtual patient through the computerized user interface. Furthermore, the student gets another opportunity to change or revise the patient diagnostic hypotheses selections and rankings that were previously entered into the differential diagnosis (DDx) selection and ranking interface. Then, as shown in the beginner student test mode flowchart (200) in FIG. 2, the student is required to finalize differential diagnosis (DDx) selections in the computerized user interface to modify the patient diagnostic hypotheses selections and rankings. The patient diagnostic hypotheses selections and rankings are then "committed" as the final differential diagnosis (DDx) selections.

Then, the student orders medical tests for the simulated virtual patient, and associates the ordered medical tests with the committed DDx selections in the healthcare diagnosis training and evaluation system. The healthcare diagnosis training and evaluation system subsequently generates results from the ordered medical tests, which are reviewed by the student. Preferably, the healthcare diagnosis training and evaluation system does not correct any mistakes or incorrect reasoning process by the student for the ordered medical tests, because the student is being simply evaluated without step-by-step expert answers in the beginner student test mode, as shown in FIG. 2. Without any system-generated expert answers or advice, the student then selects what he or she considers a definite diagnosis (Dx) for the simulated virtual patient's condition from his or her uncorrected differential diagnosis (DDx) list. Subsequently, the student creates and enters a treatment and management plan to the healthcare diagnosis training and evaluation system. Then, the healthcare diagnosis training and evaluation system compares the student's actions and information entry through the beginner student test mode with answer keys, and generates a summary of the student's performance.

FIG. 3 shows an advanced student learning mode flowchart (300) for dynamic differential diagnosis (dynamic DDx) in a healthcare diagnosis training and evaluation system, in accordance with an embodiment of the invention. In the advanced student learning mode, a student is first instructed by a computerized user interface connected to the healthcare diagnosis training and evaluation system to question and probe a simulated virtual patient to build a patient history file. The student may interact with the simulated virtual patient through the computerized user interface to ask health questions and receive answers from the simulated virtual patient. Furthermore, in some instances, the computerized user interface may enable visual inspection of the simulated virtual patient's body parts by the student. Then, the student can write notes into the computerized user interface to build the patient history file for the simulated virtual patient.

Furthermore, in the advanced student learning mode in accordance with this embodiment of the invention, the student is able to contemplate one or more hypotheses for a potentially-correct diagnosis at this early stage of patient interaction, and select and rank those hypothesis in a differential diagnosis (DDx) selection and ranking interface in the computerized user interface. Then, the patient history file constructed by the student can be compared with an expert's answers and advice through the computerized user interface. The expert feedback and answer comparison process can guide and nurture the student's diagnostic reasoning process to be more precise and time efficient.

Then, as shown in the advanced student learning mode flowchart (300) in FIG. 3, the student can perform virtual physical exams on the simulated virtual patient through health exam menu choices available in the computerized user interface connected to the healthcare diagnosis training and evaluation system. After the results of each virtual physical exam performed by the student are deciphered and interpreted by the student, the student can change or revise the patient diagnostic hypotheses selections and rankings that were previously entered into the differential diagnosis (DDx) selection and ranking interface. The updated patient diagnostic hypotheses selections and rankings, which now incorporate the student's diagnostic reasoning from the results of the virtual physical exams, are then compared with the expert's answers and advice through the computerized user interface.

Subsequently, as shown in the advanced student learning mode flowchart (300) in FIG. 3, the student has an opportunity to organize problem findings and create a "problem list" associated with the simulated virtual patient's medical condition in the computerized user interface. The student also has another opportunity to change or revise the patient diagnostic hypotheses selections and rankings that were previously entered into the differential diagnosis (DDx) selection and ranking interface. Then, the student's problem list is compared with the expert's answers and advice through the computerized user interface. With additional feedback from the expert's answers and advice on the student's problem list, the student then composes and enters a "problem statement" for the simulated virtual patient through the computerized user interface. Furthermore, the student gets another opportunity to change or revise the patient diagnostic hypotheses selections and rankings that were previously entered into the differential diagnosis (DDx) selection and ranking interface. In addition, the problem statement entered by the student in the healthcare diagnosis training and evaluation system is also compared against the expert's answers and advice on the problem statement.

Then, as shown in the advanced student learning mode flowchart (300) in FIG. 3, the student is given a repeatable chance in the computerized user interface to modify and commit the patient diagnostic hypotheses selections and rankings. At this stage of the advanced student learning mode, the patient diagnostic hypotheses selections and rankings can be "committed" as the final differential diagnosis (DDx) selections. Unlike the beginner student learning mode as previously described for FIG. 1, the advanced student learning mode does not give the expert's answers and feedback immediately when the final DDx selections are committed. Instead, the student is allowed to order medical tests and associate those medical tests with the committed DDx list, followed by the student's review and interpretation of the medical test results. In the advanced student learning mode, the student has independent analysis time and flexibility to loop back and modify the committed DDx list, order new medical tests, associate the new medical tests with the committed DDx list, and review the new medical tests.

Preferably, as shown in the advanced student learning mode flowchart (300), the loop-back iterative process is available up to four times in one embodiment of the invention. In another embodiment of the invention, the loop-back iterative process can be adjusted or varied by a healthcare content author or another operator configuring the advanced student learning mode for dynamic DDx in the healthcare diagnosis training and evaluation system. The loop-back iterative process is designed to nurture clinical diagnostic intuition, which is an essential aspect of dynamic differential diagnosis reasoning skill development for the student.

Then, the student selects what he or she considers to be the definitive diagnosis (Dx) from the student's uncorrected DDx list, which is not supervised or corrected by the expert's answers. The definitive Dx selected by the student is then entered into the computerized user interface of the healthcare diagnosis training and evaluation system, and all of the student's activities and diagnostic reasoning process, including DDx selections, rankings, medical test selections, association of the medical tests with the DDx selection, and the definitive Dx can be compared against the expert's answers and feedback at this stage. Furthermore, based on the comparison between the student's definitive Dx and the expert's answers, the student can create and enter a treatment and management plan to the healthcare diagnosis training and evaluation system. Finally, in the advanced student learning mode flowchart (300) of FIG. 3, the student's treatment and management plan is compared against the expert's model treatment plan and feedback, and a summary of the dynamic DDx learning for the advanced student learning mode is provided by the healthcare diagnosis training and evaluation system.

As shown in the advanced student learning mode flowchart (300) in FIG. 3, the advanced student learning mode in the healthcare diagnosis training and evaluation system can enable the advanced student to spend more independent time to modify and refine his or her differential diagnosis hypotheses in an iterative manner after a problem statement is composed and compared with the expert's answers and feedback.

Figure 4:
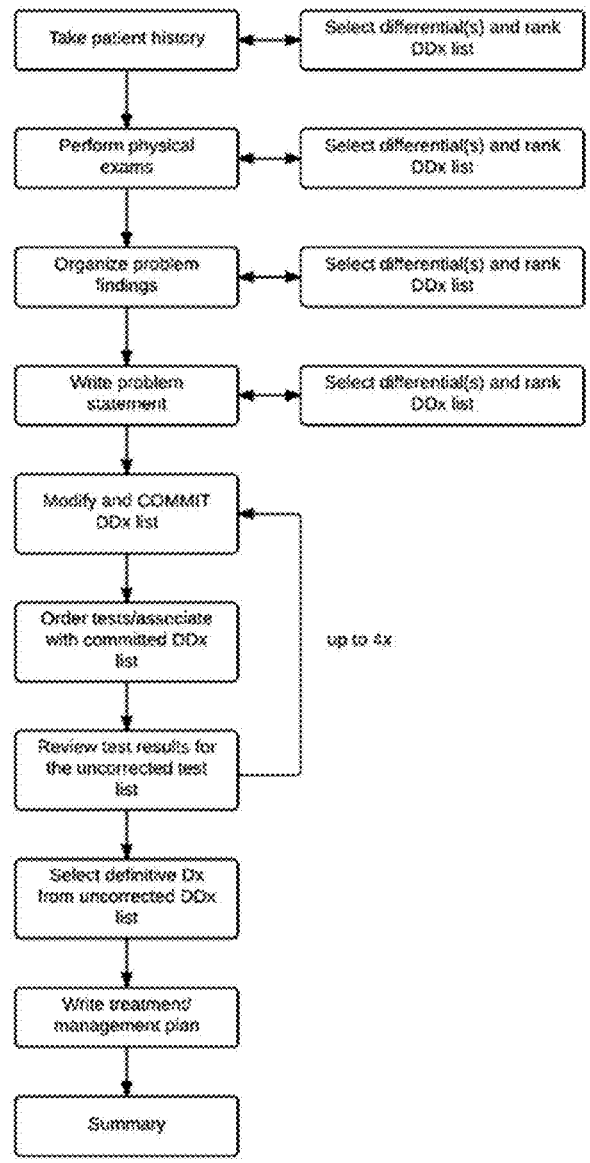
FIG. 4 shows an advanced student test mode flowchart for dynamic differential diagnosis (dynamic DDx) in a healthcare diagnosis training and evaluation system, in accordance with an embodiment of the invention.

FIG. 4 shows an advanced student test mode flowchart (400) for dynamic differential diagnosis (dynamic DDx) in a healthcare diagnosis training and evaluation system, in accordance with an embodiment of the invention. In this embodiment of the invention, a student is tested for his or her dynamic DDx reasoning skills, which may have been nurtured by interacting with the advanced student learning mode, as previously shown in FIG. 3. In the advanced student test mode, the student is evaluated by the healthcare diagnosis training and evaluation system for following correct diagnostic reasoning steps involving dynamic DDx reasoning and for arriving a correct definitive diagnosis for a simulated virtual patient. Because the student is being tested by the healthcare diagnosis training and evaluation system in the advanced student test mode, expert answers and feedbacks are not provided to the student between diagnostic reasoning steps.

As shown in the advanced student test mode flowchart (400) in FIG. 4, the student is first instructed by a computerized user interface connected to the healthcare diagnosis training and evaluation system to question and probe a simulated virtual patient to build a patient history file. The student may interact with the simulated virtual patient through the computerized user interface to ask health questions and receive answers from the simulated virtual patient. Furthermore, in some instances, the computerized user interface may enable visual inspection of the simulated virtual patient's body parts by the student. Then, the student writes notes into the computerized user interface to build the patient history file for the simulated virtual patient, and selects and ranks one or more hypotheses for a potentially-correct diagnosis through a differential diagnosis (DDx) selection and ranking interface in the computerized user interface.

Then, as shown in the advanced student test mode flowchart (400) in FIG. 4, the student performs virtual physical exams on the simulated virtual patient through health exam menu choices available in the computerized user interface connected to the healthcare diagnosis training and evaluation system. After the results of each virtual physical exam ordered by the student are deciphered and interpreted by the student, the student can change or revise the patient diagnostic hypotheses selections and rankings that were previously entered into the differential diagnosis (DDx) selection and ranking interface. Subsequently, the student has an opportunity to organize problem findings and create a "problem list" associated with the simulated virtual patient's medical condition in the computerized user interface. The student also has another opportunity to change or revise the patient diagnostic hypotheses selections and rankings that were previously entered into the differential diagnosis (DDx) selection and ranking interface.

As shown in FIG. 4, the student then composes and enters a "problem statement" for the simulated virtual patient through the computerized user interface. Furthermore, the student gets another opportunity to change or revise the patient diagnostic hypotheses selections and rankings that were previously entered into the differential diagnosis (DDx) selection and ranking interface. Then, as shown in the advanced student test mode flowchart (400) in FIG. 4, the student is required to finalize differential diagnosis (DDx) selections in the computerized user interface to modify the patient diagnostic hypotheses selections and rankings. The patient diagnostic hypotheses selections and rankings are then "committed" as the final differential diagnosis (DDx) selections.

Then, the student orders medical tests for the simulated virtual patient, and associates the ordered medical tests with the committed DDx selections in the healthcare diagnosis training and evaluation system. The healthcare diagnosis training and evaluation system subsequently generates results from the ordered medical tests, which are reviewed by the student. Preferably, the healthcare diagnosis training and evaluation system does not correct any mistakes or incorrect reasoning process by the student for the ordered medical tests, because the student is being simply evaluated without step-by-step expert answers in the advanced student test mode, as shown in FIG. 4. After reviewing the ordered medical test results for the simulated virtual patient, the student has an opportunity to loop back and modify the committed DDx selections and hypotheses, order new medical tests, and review the results of the new medical tests before concluding a definitive diagnosis (Dx). The loop-back process can repeat up to four times, if the student desires to do so, without the expert's answers or feedback.

The student then selects what he or she considers the definite diagnosis (Dx) for the simulated virtual patient's condition from his or her uncorrected differential diagnosis (DDx) list. Subsequently, the student creates and enters a treatment and management plan to the healthcare diagnosis training and evaluation system. Then, the healthcare diagnosis training and evaluation system compares the student's actions and information entry through the advanced student test mode with answer keys, and generates a summary of the student's performance.

Figure 5:
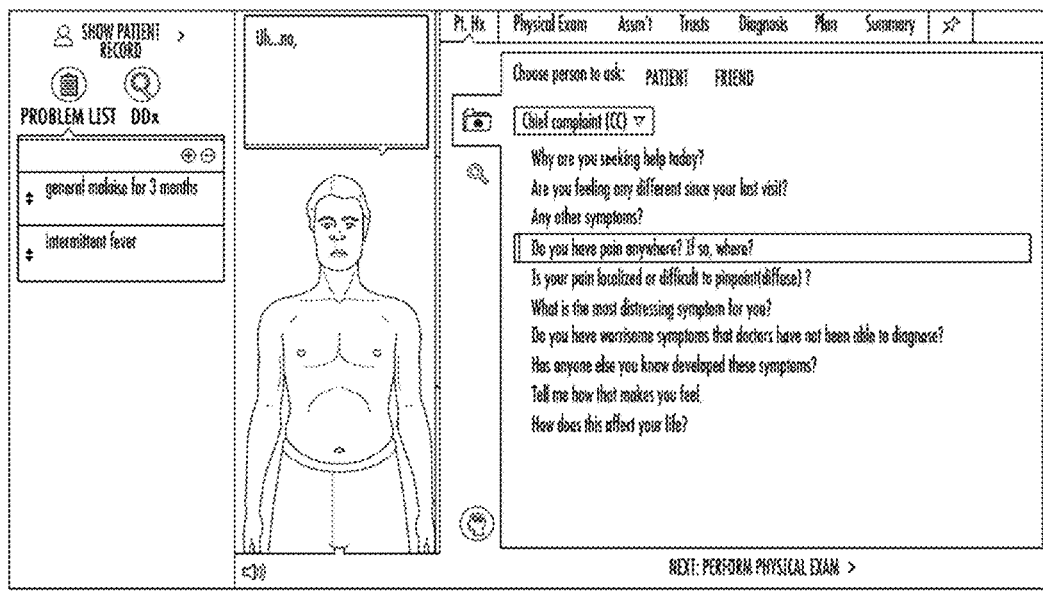
FIG. 5 shows a virtual patient health questioning interface screenshot in a healthcare diagnosis training and evaluation system, in accordance with an embodiment of the invention.

FIG. 5 shows a virtual patient health questioning interface screenshot (500) in a healthcare diagnosis training and evaluation system, in accordance with an embodiment of the invention. In a preferred embodiment of the invention at this initial stage of the dynamic DDx training, the virtual patient health questioning interface shows an image of a simulated virtual patient, a menu for entering problem findings in a problem list, a menu for entering or modifying differential diagnosis (DDx), and a menu that lists a number of questions, which are selectable by the student for asking desired questions to the simulated virtual patient. In some embodiments of the invention, the image of the simulated virtual patient may indicate visually-inspectable symptoms or sickness.

By selecting or composing desired health questions to the simulated virtual patient in the virtual patient health questioning interface, the student is able to receive simulated answers from the simulated virtual patient, which in turn helps the student to formulate an initial differential diagnosis (DDx) list that can be revised and refined in subsequent stages of diagnostic investigation for patient condition determination.

Figure 6:
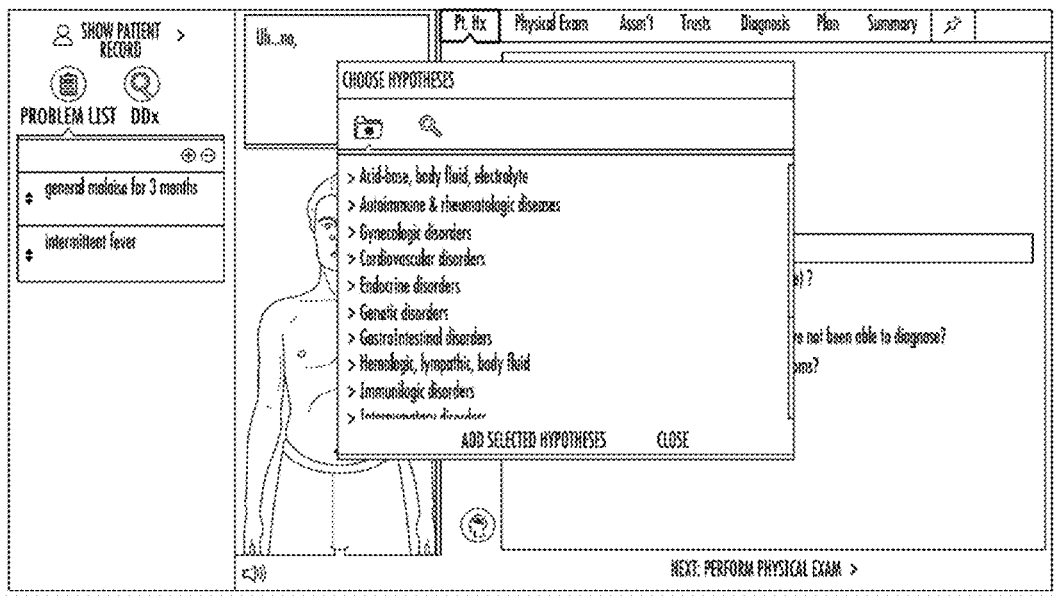
FIG. 6 shows a hypothesis selection and ranking interface screenshot during health questioning in a healthcare diagnosis training and evaluation system, in accordance with an embodiment of the invention.

FIG. 6 shows a hypothesis selection and ranking interface screenshot (600) during health questioning in a healthcare diagnosis training and evaluation system, in accordance with an embodiment of the invention. In a preferred embodiment of the invention at this stage of the dynamic DDx training, the hypothesis selection and ranking interface shows a list of hypotheses for the simulated virtual patient's clinical conditions. During health questioning to the simulated virtual patient, the student is able to select a desired hypothesis to create his or her differential diagnosis (DDx) list, which can be edited and revised in later stages of diagnostic investigation for patient condition determination. Furthermore, the student can also rank each hypothesis as "Lead," "Alternative," or "Minimum," based on the student's notion of likeliness of the correct diagnosis. These rankings can be subsequently revised or changed, as the student is exposed to more diagnostic information in later stages of investigation for patient condition determination.

Figure 7:
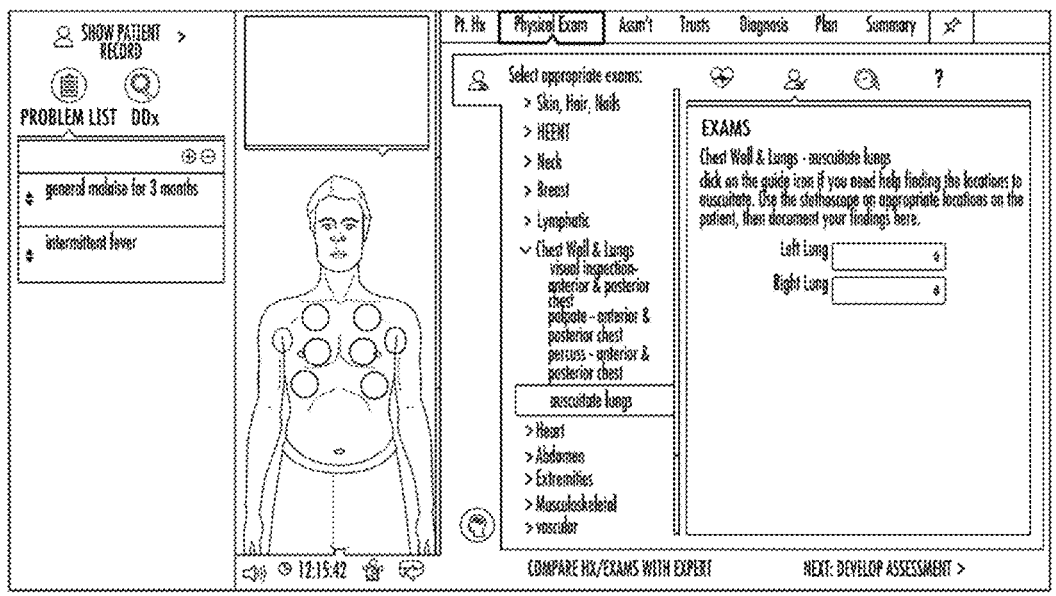
FIG. 7 shows a physical exam interface screenshot in a healthcare diagnosis training and evaluation system, in accordance with an embodiment of the invention.

FIG. 7 shows a physical exam interface screenshot (700) in a healthcare diagnosis training and evaluation system, in accordance with an embodiment of the invention. In a preferred embodiment of the invention at this stage of the dynamic DDx training, the physical exam interface incorporates a physical exam selection menu, an explanation of each physical exam, and an image of a simulated virtual patient. In certain physical exams that involve visual and/or aural variations, the image of the simulated virtual patient may show visual changes graphically. Furthermore, in some instances, the visual changes may also be synchronized with aural feedback to the student during a physical exam. The student can also record physical exam results in the physical exam interface.

Figure 8:
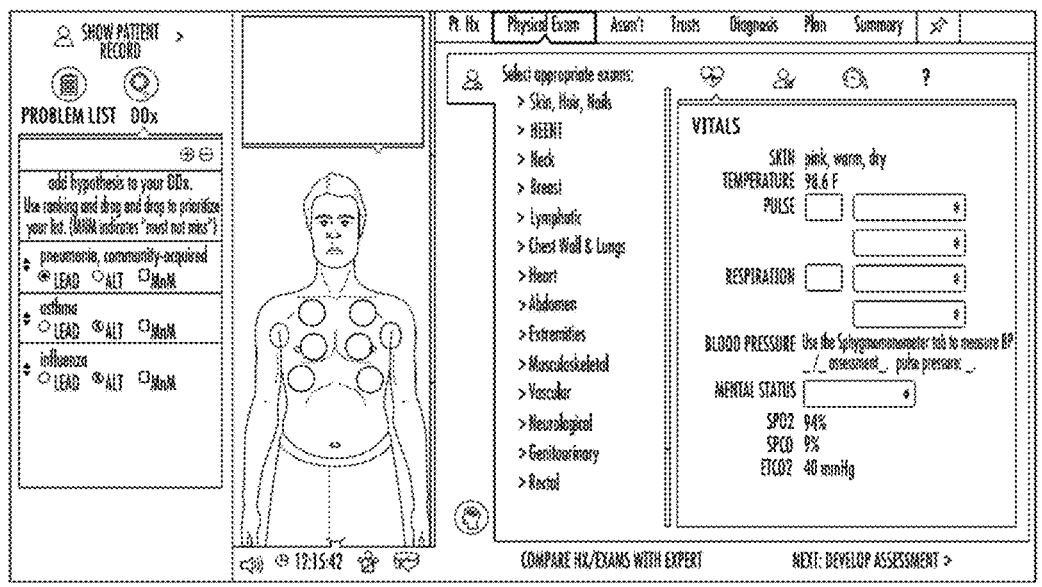
FIG. 8 shows a hypothesis selection and ranking interface screenshot during a physical exam in a healthcare diagnosis training and evaluation system, in accordance with an embodiment of the invention.

FIG. 8 shows a hypothesis selection and ranking interface screenshot (800) during a physical exam in a healthcare diagnosis training and evaluation system, in accordance with an embodiment of the invention. In this instance, the student is able to select, adjust, or revise his or her DDx list for patient condition determination during the physical exam, as shown on the left side of the hypothesis selection and ranking interface screenshot (800). Furthermore, the student can also select a desired physical exam and proceed with taking vital recordings or other notes during the physical exam, as also shown in the hypothesis selection and ranking interface screenshot (800).

Figure 9:
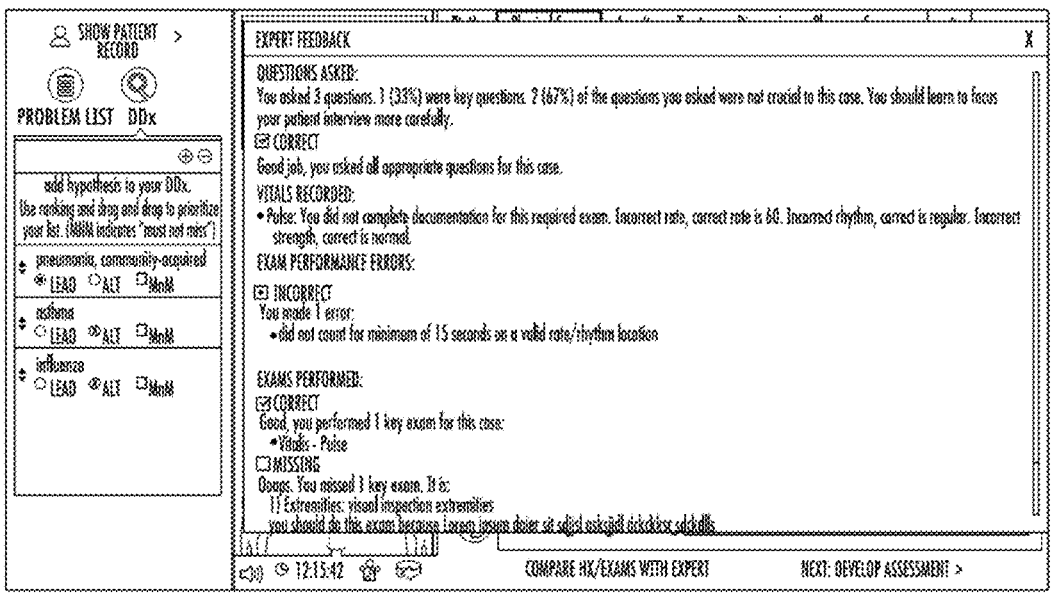
FIG. 9 shows an expert feedback interface screenshot after health questioning and physical exams in a healthcare diagnosis training and evaluation system, in accordance with an embodiment of the invention.

FIG. 9 shows an expert feedback interface screenshot (900) after health questioning and physical exams in a healthcare diagnosis training and evaluation system, in accordance with an embodiment of the invention. At this stage of learning, the student's health questioning strategies and physical exam notes are compared against expert's feedback and answers in the healthcare diagnosis training and evaluation system. The expert's feedback and answers are typically originally synthesized by the healthcare education content author, and are computer-generated with predetermined evaluation measures and feedback, which are contingent upon the student's particular health exam selections and physical exam interpretations.

After reviewing the expert's feedback and advice related to the student's diagnostic reasoning up to this point, the student is able to modify or revise the DDx list that contains diagnostic hypotheses and their likelihood rankings in the computerized user interface. In the preferred embodiment of the invention, the computerized user interface can display several components of the user interfaces at the same time, including the expert feedback interface and the DDx list menu interface.

FIG. 10 shows an interactive comparison interface screenshot (1000) for comparing a student's hypothesis with an expert's feedback as part of dynamic DDx training in a healthcare diagnosis training and evaluation system, in accordance with an embodiment of the invention. In a preferred embodiment of the invention at this stage of the dynamic DDx training, the interactive comparison interface displays a current set of the student's DDx list (i.e. a list of hypotheses for patient condition determination) and an expert's feedback related to the student's DDx list.

The interactive comparison interface can also display the student's composition of a problem list, which can also be compared against the expert's feedback. The healthcare diagnosis training and evaluation system is capable of evaluating the student's information selection and entry against the expert's feedback and answers, which are typically originally synthesized by the healthcare education content author, and are subsequently computer-generated with predetermined evaluation measures and feedback. The computer-generated expert feedback and advice are dependent upon the student's particular health exam selections, physical exam interpretations, and/or diagnostic hypothesis in a DDx list.

FIG. 11 shows a hypothesis ranking interface screenshot (1100) as part of dynamic DDx training in a healthcare diagnosis training and evaluation system, in accordance with an embodiment of the invention. At this stage of the dynamic DDx training, the student is required to finalize the ranking of the DDx list, which has already received the computer-generated expert feedback for suggestions or corrections. The student's hypothesis ranking, which may have a "lead," "alternative," or "minimum" designations in one embodiment of the invention, is further evaluated by the healthcare diagnosis training and evaluation system, and in case of a beginner student learning mode, the expert's feedback is provided to the student in the hypothesis ranking interface screenshot (1100). Preferably, the student is also able to indicate what he or she thinks as a "must not miss" hypothesis for evaluation by the healthcare diagnosis training and evaluation system, as also shown in the hypothesis ranking interface screenshot (1100).

Figure 12:
FIG. 12 shows a hypothesis and medical test association interface and expert feedback screenshot as part of dynamic DDx training in a healthcare diagnosis training and evaluation system.

FIG. 12 shows a hypothesis and medical test association interface and expert feedback screenshot (1200) as part of dynamic DDx training in a healthcare diagnosis training and evaluation system. At this stage of the dynamic DDx training, the student is required to associate desired medical tests with the student's hypotheses in the DDx list, as shown in FIG. 12. In case of a beginner student learning mode, the expert's feedback is provided to the student in the hypothesis and medical test association interface and expert feedback screenshot (1200), as previously shown in FIG. 1. In case of an advanced student learning mode, the expert feedback may not be provided at this stage, and the student is allowed to explore what he or she deduces as a correct diagnosis for the simulated virtual patient's condition through an iterative process of modifying the hypotheses in the committed DDx list, ordering medical tests, associating the results of the medical tests with the committed DDx list, and reviewing the results of the medical test results, as previously shown in FIG. 3.

Figure 13:
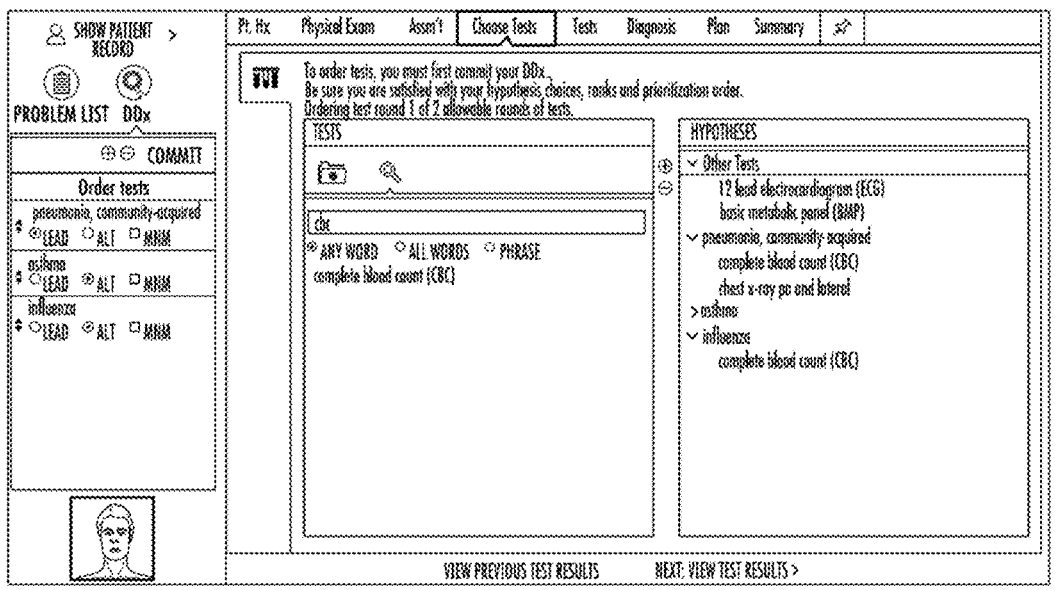
FIG. 13 shows a medical test selection and DDx commitment interface screenshot as part of dynamic DDx training in a healthcare diagnosis training and evaluation system, in accordance with an embodiment of the invention.

FIG. 13 shows a medical test selection and DDx commitment interface screenshot (1300) as part of dynamic DDx training in a healthcare diagnosis training and evaluation system, in accordance with an embodiment of the invention. In this embodiment of the invention, the student is able to choose and order a desired medical test from the medical test selection and DDx commitment interface after committing to a finalized DDx list. Furthermore, the medical test selection and DDx commitment interface also allow associating the student's hypotheses in the finalized DDx list with one or more medical tests before receiving the medical test results.

Figure 14:
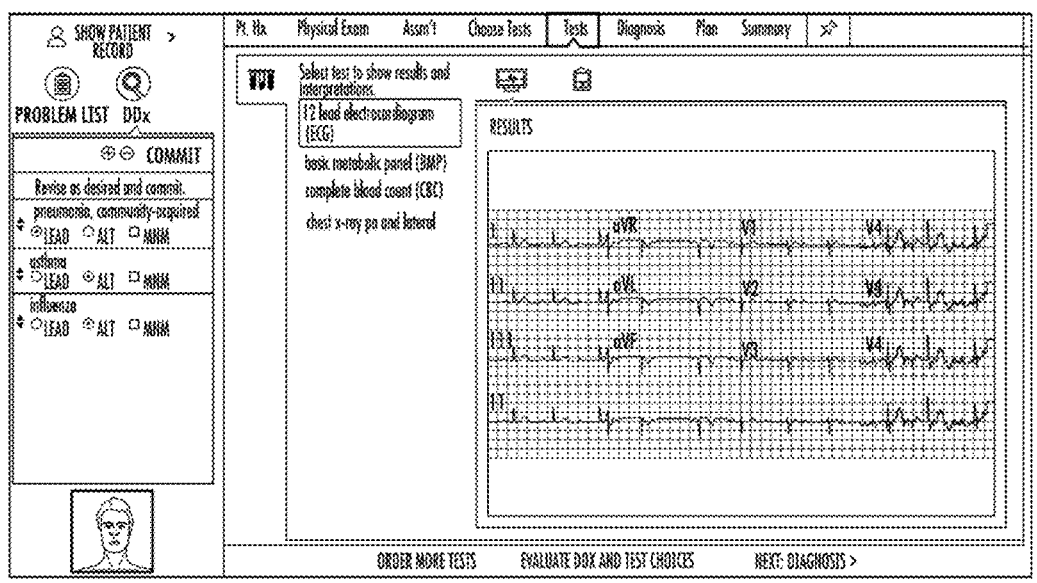
FIG. 14 shows a medical test result interface screenshot as part of dynamic DDx training in a healthcare diagnosis training and evaluation system, in accordance with an embodiment of the invention.

FIG. 14 shows a medical test result interface screenshot (1400) as part of dynamic DDx training in a healthcare diagnosis training and evaluation system, in accordance with an embodiment of the invention. At this stage of the dynamic DDx training, the student can review the results of the medical tests that were ordered in a previous step, and also formulate a definitive diagnosis (Dx) from the finalized DDx list, if the student feels comfortable in making the definitive diagnosis (Dx). In case of the beginner student learning mode, the finalized DDx list may have been corrected through the expert's feedback and advisory. In case of the advanced student learning mode, the finalized DDx list can be revised in an iterative process that also involves new medical test ordering, associating the new medical tests with the finalized DDx list, and reviewing the medical test results, until the student feels comfortable in making the definitive diagnosis (Dx).

Figure 15:
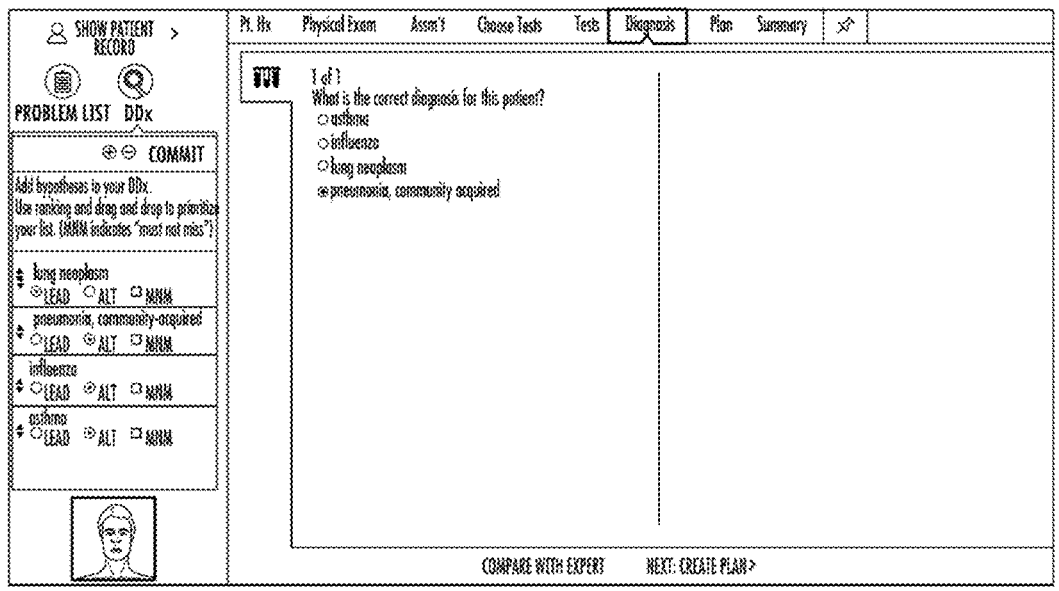
FIG. 15 shows a student diagnosis evaluation interface screenshot as part of dynamic DDx training in a healthcare diagnosis training and evaluation system, in accordance with an embodiment of the invention.

FIG. 15 shows a student diagnosis evaluation interface screenshot (1500) as part of dynamic DDx training in a healthcare diagnosis training and evaluation system, in accordance with an embodiment of the invention. At this stage of the dynamic DDx training, the student makes a definitive diagnosis (Dx) (e.g. pneumonia, community-acquired) in the student diagnosis evaluation interface based on his or her dynamic DDx reasoning for determining the simulated virtual patient's condition.

Figure 16:
FIG. 16 shows a student hypotheses evaluation and expert feedback interface screenshot as part of dynamic DDx training in a healthcare diagnosis training and evaluation system, in accordance with an embodiment of the invention.

FIG. 16 shows a student hypotheses evaluation and expert feedback interface screenshot (1600) as part of dynamic DDx training in a healthcare diagnosis training and evaluation system, in accordance with an embodiment of the invention. At this evaluation stage of the dynamic DDx training, the student's committed hypotheses selections are compared against the expert's answers and feedback. The healthcare diagnosis training and evaluation system indicates which hypotheses selections are correct or incorrect. Furthermore, if necessary, the expert's feedback and answers may also explain which hypotheses should have been also included in the student's committed hypotheses selections.

FIG. 17 shows a student diagnosis evaluation and expert feedback interface screenshot (1700) as part of dynamic DDx training in a healthcare diagnosis training and evaluation system, in accordance with an embodiment of the invention. In this screenshot, the student selected a definitive diagnosis (Dx) (i.e. pneumonia, community-acquired), which is determined by the healthcare diagnosis training and evaluation system to be an incorrect conclusion. The correct answer (i.e. chronic fatigue syndrome) is color-coded as orange, and a detailed explanation is presented by the expert's feedback and answers, as shown in the student diagnosis evaluation and expert feedback interface screenshot (1700).

Various embodiments of the invention have been described above and also illustrated in part by FIGS. 1-17. The present invention provides a novel dynamic differential diagnosis (dynamic DDx) training and evaluation system that teaches and nurtures the real-life clinical patient diagnostic reasoning processes, which are not present in conventional e-learning healthcare education solutions for the students in the healthcare industry. Furthermore, the present invention also uniquely provides a dynamic differential diagnosis training and evaluation system and a related method that enable testing and evaluation of a student's dynamic differential diagnosis reasoning skills for patient condition determination. Moreover, the present invention also uniquely provides a dynamic differential diagnosis training and evaluation system that incorporates robust training guidance and evaluation feedback conceived by a healthcare education expert who utilizes a robust set of clinical research data linked to a healthcare content authoring platform.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A healthcare diagnosis training and evaluation system comprises:
    a virtual patient examination simulator interface module that renders a computer graphics animation of a virtual physical exam diagnostic device and a real-time motory change to an organ or a body part of an animated virtual patient when a user's diagnostic gesture pattern is drawn with a mouse or a finger on top of the animated virtual patient on a display screen, wherein the virtual patient examination simulator interface prompts the user to specify diagnostic prediction indicators for a diagnostics result before invoking the user's diagnostic gesture pattern to initiate a diagnostics test and determine correctness of the user's diagnostic indicators, wherein the real-time motory change to the organ or the body part and the diagnostics test is associated with an ocular motor examination, and wherein the user's diagnostic gesture pattern drawn on top of the animated virtual patient is an "H" pattern gestured over the animated virtual patient's eyes with the mouse or the finger;
    a learning mode selection interface module that generates a user selection menu for a basic linear learning mode, a beginner student learning mode for dynamic differential diagnosis, and an advanced student learning mode for dynamic differential diagnosis;
    a hypothesis selection and ranking interface module that allows a student to add, delete, rank, or modify a hypothesis in the differential diagnosis list during a health questioning, a simulated physical exam, a simulated medical test, and a simulated medical tests review, wherein the hypothesis selection and ranking interface module generates a differential diagnosis management menu to create or modify a differential diagnosis list for patient condition determination;
    a virtual patient health questioning interface module that generates a list of health questions selected by a student, an image of a simulated virtual patient, and simulated responses from the simulated virtual patient from the list of health questions, wherein the virtual patient health questioning interface module also incorporates the differential diagnosis management menu to allow the student to create or modify the differential diagnosis list for patient condition determination;
    a physical exam interface module that enables the student to perform the simulated physical exam on the simulated virtual patient, wherein the physical exam interface module also incorporates the differential diagnosis management menu to allow the student to revise the differential diagnosis list for patient condition determination during or after the simulated physical exam;
    a hypothesis and medical test association interface module that allows the student to associate the simulated medical test to a particular hypothesis in the differential diagnosis list, wherein the hypothesis and medical test association interface module also incorporates the differential diagnosis management menu to allow the student to revise the differential diagnosis list for patient condition determination;
    a medical test selection and differential diagnosis commitment interface module that requires the student to commit a current set of the differential diagnosis list for computerized evaluation, while also requiring the student to finalize simulated medical test selections for patient condition determination;
    a medical test results interface module that generates results of the simulated medical test, wherein the results are reviewed by the student for deducing a definitive diagnosis for evaluation;
    an expert feedback interface module that generates at least one of advice, feedback, and answers to guide the student through the dynamic differential diagnosis reasoning during display of information from the hypothesis selection and ranking interface module, the virtual patient health questioning interface module, the physical exam interface module, the hypothesis and medical test association interface module, the medical test selection and differential diagnosis commitment interface module, and the medical test results interface module;
    a student diagnosis evaluation interface module that compares the definitive diagnosis and associated diagnostic reasoning from the student against at least one of advice, feedback, and answers from the expert feedback interface module, wherein the student diagnosis evaluation interface module also generates a grading result based on correctness of the definitive diagnosis and the associated diagnostic reasoning from the student; and
    a central processing unit (CPU) and a memory unit of a computer system or another electronic device, wherein the CPU and the memory unit execute at least one of the virtual patient examination simulator interface module, the learning mode selection interface module, the hypothesis selection and ranking interface module, the virtual patient health questioning interface module, the physical exam interface module, the hypothesis and medical test association interface module, the medical test selection and differential diagnosis commitment interface module, the medical test results interface module, the expert feedback interface module, and the student diagnosis evaluation interface module.

2. The healthcare diagnosis training and evaluation system of claim 1, further comprising a summary report generation interface module that generates a summary of the student's dynamic differential diagnosis reasoning and at least one of advice, feedback, and answers from the expert feedback interface module.

3. The healthcare diagnosis training and evaluation system of claim 1, further comprising a loop-back feature to enable the student to modify a committed differential diagnosis list, order new simulated medical tests, associate the new simulated medical tests with the committed differential diagnosis list, and review results of the new simulated medical tests in a multiple number of loop-back iterations.

4. The healthcare diagnosis training and evaluation system of claim 3, wherein the loop-back feature is part of the advanced student learning mode for dynamic differential diagnosis.

5. The healthcare diagnosis training and evaluation system of claim 1, wherein the student is a medical student, a nurse trainee, a paramedic trainee, a physician-in-training, or another healthcare professional.

6. The healthcare diagnosis training and evaluation system of claim 1, further comprising a display panel connected to the computer system or another electronic device, wherein the display panel displays computerized user interface information from the learning mode selection interface module, the hypothesis selection and ranking interface module, the virtual patient health questioning interface module, the physical exam interface module, the hypothesis and medical test association interface module, the medical test selection and differential diagnosis commitment interface module, the medical test results interface module, the expert feedback interface module, and the student diagnosis evaluation interface module.

7. A healthcare diagnosis training and evaluation system comprises:
a virtual patient examination simulator interface module that renders a computer graphics animation of a virtual physical exam diagnostic device and a real-time motory change to an organ or a body part of an animated virtual patient when a user's diagnostic gesture pattern is drawn with a mouse or a finger on top of the animated virtual patient on a display screen, wherein the virtual patient examination simulator interface prompts the user to specify diagnostic prediction indicators for a diagnostics result before invoking the user's diagnostic gesture pattern to initiate a diagnostics test and determine correctness of the user's diagnostic indicators, wherein the real-time motory change to the organ or the body part and the diagnostics test is associated with an ocular motor examination, and wherein the user's diagnostic gesture pattern drawn on top of the animated virtual patient is an "H" pattern gestured over the animated virtual patient's eyes with the mouse or the finger;
a test mode selection interface module that generates a user selection menu for a basic linear test mode, a beginner student test mode for dynamic differential diagnosis, and an advanced student test mode for dynamic differential diagnosis;
a hypothesis selection and ranking interface module that allows a student to add, delete, rank, or modify a hypothesis in the differential diagnosis list during a health questioning, a simulated physical exam, a simulated medical test, and a simulated medical tests review, wherein the hypothesis selection and ranking interface module generates a differential diagnosis management menu to create or modify a differential diagnosis list for patient condition determination;
a virtual patient health questioning interface module that generates a list of health questions selected by a student, an image of a simulated virtual patient, and simulated responses from the simulated virtual patient from the list of health questions, wherein the virtual patient health questioning interface module also incorporates the differential diagnosis management menu to allow the student to create or modify the differential diagnosis list for patient condition determination;
a physical exam interface module that enables the student to perform the simulated physical exam on the simulated virtual patient, wherein the physical exam interface module also incorporates the differential diagnosis management menu to allow the student to revise the differential diagnosis list for patient condition determination during or after the simulated physical exam;
a hypothesis and medical test association interface module that allows the student to associate the simulated medical test to a particular hypothesis in the differential diagnosis list, wherein the hypothesis and medical test association interface module also incorporates the differential diagnosis management menu to allow the student to revise the differential diagnosis list for patient condition determination;
a medical test selection and differential diagnosis commitment interface module that requires the student to commit a current set of the differential diagnosis list for computerized evaluation, while also requiring the student to finalize simulated medical test selections for patient condition determination;
a medical test results interface module that generates results of the simulated medical test, wherein the results are reviewed by the student for deducing a definitive diagnosis for evaluation;
a treatment and management plan composition interface module that takes the student's input for a treatment and management plan;
a student diagnosis evaluation interface module that evaluates the definitive diagnosis, the treatment and management plan, and associated diagnostic reasoning to generate a grading result based on correctness of the definitive diagnosis, the treatment and management plan, and the associated diagnostic reasoning from the student; and
a central processing unit (CPU) and a memory unit of a computer system or another electronic device, wherein the CPU and the memory unit execute at least one of the virtual patient examination simulator interface module, the testing mode selection interface module, the hypothesis selection and ranking interface module, the virtual patient health questioning interface module, the physical exam interface module, the hypothesis and medical test association interface module, the medical test selection and differential diagnosis commitment interface module, the medical test results interface module, the treatment and management plan composition interface module, and the student diagnosis evaluation interface module.

8. The healthcare diagnosis training and evaluation system of claim 7, further comprising a summary report generation interface module that generates a summary of the student's dynamic differential diagnosis reasoning and the grading result from the student diagnosis evaluation interface module.

9. The healthcare diagnosis training and evaluation system of claim 7, further comprising a loop-back feature to enable the student to modify a committed differential diagnosis list, order new simulated medical tests, associate the new simulated medical tests with the committed differential diagnosis list, and review results of the new simulated medical tests in a multiple number of loop-back iterations.

10. The healthcare diagnosis training and evaluation system of claim 9, wherein the loop-back feature is part of the advanced student test mode for dynamic differential diagnosis.

11. The healthcare diagnosis training and evaluation system of claim 7, wherein the student is a medical student, a nurse trainee, a paramedic trainee, a physician-in-training, or another healthcare professional.

12. The healthcare diagnosis training and evaluation system of claim 7, further comprising a display panel connected to the computer system or another electronic device, wherein the display panel displays computerized user interface information from the testing mode selection interface module, the hypothesis selection and ranking interface module, the virtual patient health questioning interface module, the physical exam interface module, the hypothesis and medical test association interface module, the medical test selection and differential diagnosis commitment interface module, the medical test results interface module, the treatment and management plan composition interface module, and the student diagnosis evaluation interface module.

* * * * *